United States Patent [19]

Mori et al.

[11] Patent Number: 5,116,692
[45] Date of Patent: May 26, 1992

[54] MULTI-LAYER TYPE SLIDING BEARING OF ALUMINUM ALLOY AND METHOD OF PRODUCING THE SAME

[75] Inventors: Sanae Mori; Masaaki Sakamoto, both of Nagoya; Hideo Ishikawa, Komaki; Yoji Nagai, Nagoya, all of Japan

[73] Assignee: Daido Metal Company Ltd., Nagoya, Japan

[21] Appl. No.: 359,549

[22] Filed: Jun. 1, 1989

[30] Foreign Application Priority Data

Jun. 2, 1988 [JP] Japan .................... 63-136342

[51] Int. Cl.$^5$ .............................. B32B 15/10
[52] U.S. Cl. .................................... 428/650
[58] Field of Search ........................ 428/650

[56] References Cited

U.S. PATENT DOCUMENTS 4,732,820  3/1988  Mori .................................. 420/650
4,937,149  6/1990  Mori .................................. 420/650

FOREIGN PATENT DOCUMENTS 186414  12/1984  European Pat. Off. .
702188   5/1952  United Kingdom .
1365354  9/1974  United Kingdom .

Primary Examiner—Peter D. Rosenberg
Attorney, Agent, or Firm—Browdy and Neimark

[57] ABSTRACT

A multi-layer type sliding bearing of aluminum alloy and a method of producing the same are disclosed. The multi-layer type sliding bearing includes a mixture layer which has a thickness of not more than 0.5 microns and which is constituted by a mixture of the constituents of the overlay and one element selected from the group consisting of Ni, Co and Fe. The mixture layer is provided between the overlay and a bearing layer of aluminum alloy. In order to prevent fretting, a 0.1 to 5 micron thick plating layer may be provided on the surface of a backing layer of steel which is located on the rear-face side of the bearing. This plating layer consists of the constituents which are the same as those of the overlay.

10 Claims, 2 Drawing Sheets

MULTI-LAYER TYPE SLIDING BEARING OF ALUMINUM ALLOY AND METHOD OF PRODUCING THE SAME

BACKGROUND OF THE INVENTION

1. Field of the Invention

The present invention relates to bearings suitable for use in automobiles, ships, agricultural machines and the like and, more particularly, to a multi-layer type sliding bearing of aluminum alloy which excels in the anti-seizure property, the anti-fatigue property and the anti-fretting property.

2. Description of the Related Art

It has heretofore been common practice that sliding bearings of aluminum alloy are used in gasoline engines or engines for small automobiles with the sliding-bearing surfaces being coated with no overlay. On the other hand, bearings of aluminum alloy which have an Ni-plating intermediate layer and an overlay consisting essentially of a Pb alloy have been employed in the field of sliding bearings which are primarily used with special types of engines such as high-load engines or medium-speed diesel engines. Another example of the prior art is known in which Sn or an Sn alloy is applied as an overlay to a bearing of Cu-Pb alloy or Pb-bronze alloy which is exclusively intended for engines for use in specific types of medium- or low-speed ship. This prior art makes use of the properties of Sn alloys having corrosion resistance and abrasion resistance which are high compared to those of Pb alloys. The art of providing an Sn overlay on an aluminum alloy is shown in Japanese Patent Unexamined Publication No. 61-153286, which discloses a bearing member in which a bearing layer of aluminum alloy is directly plated with Sn without an Ni intermediate layer.

The opportunities for employing gasoline engines or diesel engines for use in small automobiles such as passenger cars in the range of high-speed rotation have been increasing particularly recently. In the situation, it has been desired to improve to a great extent the seizure resistance, abrasion resistance, fatigue resistance, corrosion resistance and fretting resistance of engine bearings.

As is known, a conventional type of bearing of Cu-Pb or Pb-bronze alloy provided with an Pb-alloy overlay is disadvantageous in terms of corrosion resistance. Moreover, it has recently been noted that the properties of lubricating oil are deteriorated rapidly and seriously during use thereof, particularly due to an extension in the life of engine bearings and a rise in oil temperature as a result of an increase in the rotational speed of engines. In particular, an organic acid resulting from the deteriorations of lubricating oil is apt to corrode the Cu-Pb alloy or the Cu-bronze alloy to a remarkable extent. In addition, in order to achieve a reduction in the manufacturing cost of engines, there are many cases where crankshafts are made of ductile cast iron. However, the use of ductile cast iron often causes rapid abrasion or rapid seizure in the above-described conventional three-layer type bearings.

In view of the problems, bearings of aluminum alloy have recently been being employed in place of such Cu-Pb type three-layer bearings. Aluminum alloys are generally compatible in nature with shafts of ductile iron and have a satisfactory corrosion-resistant property. However, if a bearing made of such an aluminum alloy is employed without an overlay, partial striking or misalignment is apt to occur. Moreover, since dust is not easily separated from aluminum alloys, the phenomenon of seizure may take place early in the service life of the bearing if the application conditions are not satisfactory. If an overlay consisting essentially of a conventional Cu alloy is provided on such a bearing of aluminum alloy as shown in Japanese Patent Unexamined Publication No. 62-110021, it follows that the problems of corrosion resistance and abrasion resistance are again encountered. To overcome these problems, Japanese Patent Unexamined Publication No. 60-36641 discloses the art of utilizing, instead of an Pb alloy, an Sn alloy as an overlay. Japanese Patent Unexamined No. 61-153286 discloses a bearing member in which a bearing layer of aluminum alloy is directly plated with Sn without an Ni intermediate layer.

These conventional methods utilizing overlays, however, have the following problems. In a case where an overlay is provided on an aluminum alloy by electroplating, it is customary to provide an intermediate layer of Ni, Co, Fe or the like in order to ensure the adhesion of the overlay. However, such an intermediate layer is extremely hard and, when the overlay wears out so that the surface of the intermediate layer is exposed, the intermediate layer comes into frictional contact with the shaft to cause seizure or galling. Various disadvantages incurred by the provision of the intermediate layer have been pointed out, particularly in recent years. Although there exists a method of directly providing an overlay without forming the intermediate layer, the bonding strength of the overlay which is realized by this method is extremely low compared to the bonding strength of an overlay combined with an intermediate layer (in the prior art, typically having 0.5 to 3.0 microns in thickness). This type of overlay which is directly provided has a good initial compatibility but inferior durability and there is such disadvantage that laminer abrasion or the exfoliation of the overlay is apt to occur. For this reason, this overlay has been merely provided as a sacrificing layer.

Moreover, the recent trend toward reductions in the size and weight of engines has lead to decrease in rigidity of the housing of an engine, so that the phenomenon of fretting (the phenomenon of abrasion occurring between two contacting surfaces which are exposed to a relative motion of small amplitude) occurring on the rear face of the bearing has become a serious problem to be improved.

SUMMARY OF THE INVENTION

It is, therefore, a first object of the present invention to provide a multi-layer type sliding bearing of aluminum alloy in which the disadvantages of the prior art are improved as well as to provide a method of producing the same.

It is a second object of the present invention to provide a multi-layer type sliding bearing of aluminum alloy in which the disadvantages of the prior art are improved and on the rear face of which fretting is minimized as well as to provide a method of producing the same.

To achieve the first object, in accordance with a first aspect of the present invention, there is provided a multi-layer type sliding bearing of aluminum alloy which has a backing layer of steel, a bearing layer of aluminum alloy bonded to the backing layer, and an overlay bonded to the bearing layer of aluminum alloy.

The overlay substantially consists by weight of 0 to 15% Cu, 0 to 20% Sb, and the balance Sn and incidental impurities. A mixture layer having a thickness of not more than 0.5 microns is provided between the bearing layer of the aluminum alloy and the overlay and is bonded to both the bearing layer and the overlay, the mixture layer being constituted by a mixture of the overlay and one element selected from the group consisting of Ni, Co and Fe.

To achieve the second object, in accordance with a second aspect of the present invention, there is provided a multi-layer type sliding bearing of aluminum alloy which has a backing layer of steel, a bearing layer of aluminum alloy bonded to the inner face of the backing layer, an overlay bonded to the bearing layer of aluminum alloy, and a rear face-plating layer bonded to the outer face of the backing layer of steel and consisting of constituents which are the same as those of the overlay. The overlay substantially consists by weight of 0 to 15% Cu, 0 to 20% Sb, and the balance Sn and incidental impurities, and a mixture layer having a thickness of not more than 0.5 microns is provided between the bearing layer of aluminum alloy and the overlay and is bonded to both the bearing layer and the overlay, the mixture layer being constituted by a mixture of the overlay and one element selected from the group consisting of Ni, Co and Fe.

It is preferable that the rear face-plating layer have a thickness of 0.1 to 5 microns. If the thickness is smaller than 0.1 microns, it is impossible to obtain the effect of preventing fretting even if the rear face-plating layer is provided, while if the thickness is greater than 5 microns, the phenomenon of migration is apt to occur (, that is, a phenomenon in which foreign matter, degraded matter, or powder due to abrasion are collected and accumulated between two contacting surfaces due to small relative motions).

The thickness of the mixture layer is preferably 0.05 to 0.3 microns.

The overlay preferably consists by weight of not more than 5% Cu, 0.5 to 10% Sb, and the balance Sn.

A method of producing a multi-layer type sliding bearing of aluminum alloy according to the present invention, comprises the steps of: providing a half cylindrical or cylindrical bearing member made of a backing layer of steel and an aluminum alloy bonded to the backing layer; providing a layer, by electroless plating, on one face of the bearing layer of aluminum alloy, the layer having a thickness of less than 0.5 microns and consisting of one kind of element selected from the group consisting of Ni, Co and Fe; electrolytically providing an overlay, which consists by weight of 0 to 15% Cu, 0 to 20% Sb, and the balance Sn and incidental impurities, on the layer of one element selected from the group consisting of Ni, Co and Fe.

The present inventors found that if a mixture layer which has a thickness of not more than 0.5 microns and which is constituted by a mixture of the constituents of the overlay and one element selected from the group consisting of Ni, Co and Fe is provided between the bearing layer of aluminum alloy and the overlay of a multi-layer type sliding bearing, it is possible to improve all of the aforesaid disadvantages of the prior art, that is, the disadvantage experienced with bearings of aluminum alloy without overlays, the disadvantage involved in the art of providing an overlay without an intermediate layer, and the disadvantage involved in the art of providing an overlay with an intermediate layer.

Briefly, the mixture layer having a thickness of not more than 0.5 microns serves to enhance the bonding strength between the overlay and the bearing layer of aluminum alloy, thereby preventing the laminer abrasion or the exfoliation of the overlay. In addition, even after the overlay has been lost due to abrasion, it is possible to completely prevent galling between the shaft and the bearing.

In a case where the thickness of the mixture layer is more than 0.5 microns, when the overlay has been lost due to abrasion, the bearing and the shaft are apt to suffer seizure and galling.

Cu and Sb have the effect of enhancing the durability of the overlay without deteriorating the compatibility inherent in Sn which is a primary component of the overlay. However, if the Cu content exceeds 10% and/or if the Sb content exceeds 20%, the overlay-forming alloy becomes brittle and fatigue cracks easily occur due to impact loads. Moreover, the hardness of this overlay-forming alloy increases to deteriorate the compatibility necessary in the overlay.

Further, in the present invention it is possible to suppress the occurrence of fretting by providing on the surface of the backing layer which is located on the rear side of the bearing a plating layer which consists of the same constituents as those of the overlay provided on the inner face of the bearing layer. The thickness of this plating layer provided on the rear face of the bearing is 0.1 to 5 microns, preferably 0.5 to 5 microns. If this thickness is smaller than 0.1 microns, the effect of the plating layer will become small and the rust preventing effect on the backing layer is therefore reduced. On the other hand, if the thickness is greater than 5 microns, the aforesaid migration is apt to occur and the performance of the bearing is therefore deteriorated. Moreover, variations may occur in the thickness of the plating layer during production thereof. For these reasons, the thickness greater than 5 microns is not desirable. For the sake of simplification of the production process, it is preferable to provide this plating layer on the surface of the backing layer, which is located on the rear-face side of the bearing, by electroplating at the same time when the overlay is provided on the inner surface of the bearing layer which is located on the inner side of the bearing. However, it is possible to provide a rear face-plating layer which consists of constituents which differ from those of the overlay, and it is also possible to add the rear face-plating player in a process step separate from the process step of providing the overlay.

In the case of bearings for use in applications which require no anti-fretting property, it is not necessary to provide the plating layer on the surface of the backing layer which is located on the rear side of the bearing.

BRIEF DESCRIPTION OF THE DRAWINGS

FIG. 2a-1 is a schematic view showing the surface analysis of the intermediate layer of FIG. 2a using an electron probe microanalyzer (hereinafter referred to as "EMPA");

FIG. 2b-1 is a schematic view showing the surface analysis, using EPMA, of each layer shown in FIG. 2a;

FIG. 2c-1 is a schematic view showing the surface analysis, using EPMA, of the mixture layer shown in FIG. 2c.

DESCRIPTION OF THE PREFERRED EMBODIMENTS

Preferred embodiments of the present invention will be described in detail below with reference to the accompanying drawings.

Figure 1:
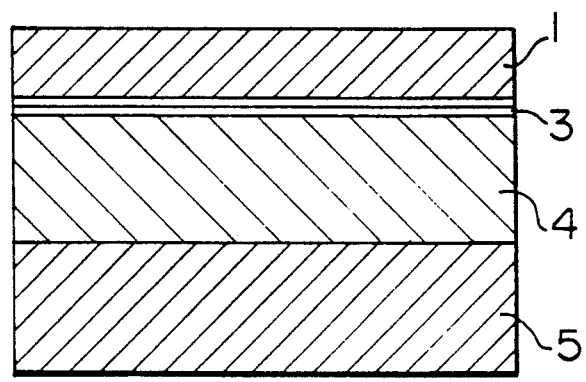
FIG. 1 is a schematic view of the sectional structure of a sliding bearing according to a first embodiment of the present invention.

FIG. 1 shows a first embodiment of a multilayer type sliding bearing of aluminum alloy. The illustrated multi-layer type sliding bearing of aluminum alloy has an overlay 1, a mixture layer 3, a bearing layer 4 of aluminum alloy, and a backing layer 5 of steel. The overlay 1 is bonded to one side of the bearing layer 4 of aluminum alloy with the mixture layer 3 interposed therebetween, and the other side of the bearing layer 4 of aluminum alloy is bonded to the backing layer 5. The overlay 1 substantially consists by weight of 0 to 15% Cu, 0 to 20% Sb, and the balance Sn and incidental impurities. The mixture layer 3, which has a thickness of not more than 0.5 microns, is formed between the overlay 1 and the bearing layer 4 of aluminum alloy in such a manner that the mixture layer 3 is bonded to both the overlay 1 and the bearing layer 4. The mixture layer 3 is constituted by a mixture of the constituents of the overlay 1 and one element selected from the group consisting of Ni, Co and Fe.

Figure 3:
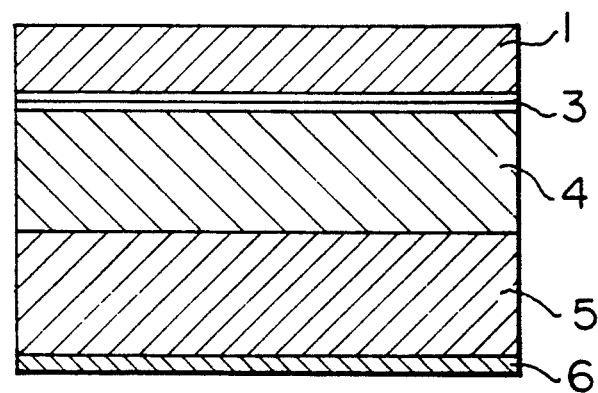
FIG. 3 is a schematic view of the sectional structure of a sliding bearing according to a second embodiment of the present invention.
Figure 2A:
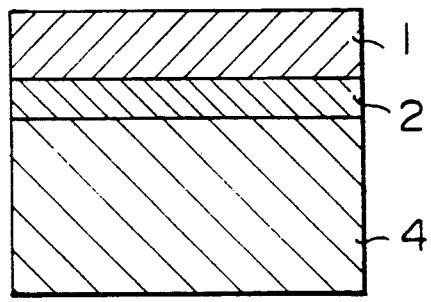
FIG. 2a is a schematic view of the sectional microstructure of a conventional sliding bearing having an overlay provided with an intermediate layer.
Figures 1, 2A:
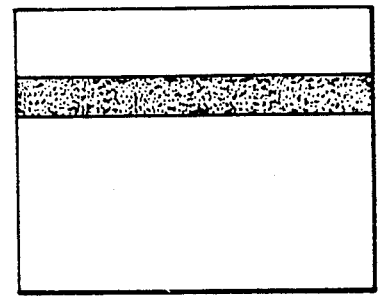
Figure 2B:
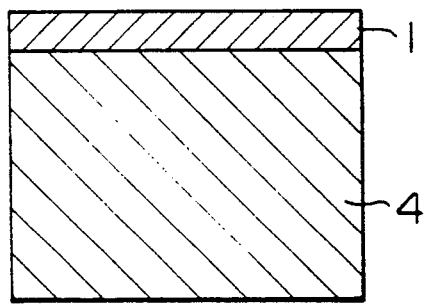
FIG. 2b is a schematic view of the sectional microstructure of a conventional sliding bearing having an overlay without an intermediate layer.
Figures 1, 2B:
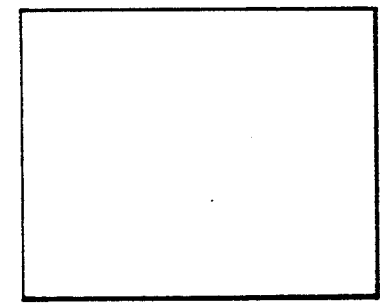
Figure 2C:
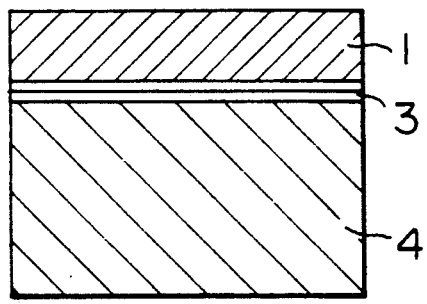
FIG. 2c is a schematic view of the sectional microstructure of the sliding bearing shown in FIG. 1 embodying the present invention.
Figures 1, 2C:
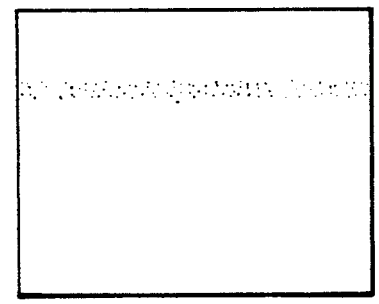

FIG. 3 shows a second embodiment of the multilayer type sliding bearing of aluminum alloy according to the present invention. The illustrated multi-layer type sliding bearing of aluminum alloy has a rear-face plating layer 6 in addition to the overlay 1, the mixture layer 3, the bearing layer 4 of aluminum alloy, and the backing layer 5 of steel which are shown in FIG. 1. The bearing layer 4 of aluminum alloy is bonded to the inner face (upper side as viewed in FIG. 3) of the backing layer 5, and the overlay 1 is bonded to the bearing layer 4 of aluminum alloy with the mixture layer 3 interposed therebetween in a manner similar to that shown in FIG. 1. The rear face-plating layer 6 is bonded to the outer face (lower side as viewed in FIG. 3) of the backing layer 6 of steel and consists of constituents which are the same as those of the overlay 1. The overlay 1 substantially consists by weight of 0 to 15% Cu, 0 to 20% Sb, and the balance Sn and incidental impurities. The mixture layer 3, which has a thickness of not more than 0.5 microns, is formed between the bearing layer 4 of aluminum alloy and the overlay 1 in such a manner that the mixture layer 3 is bonded to both the overlay 1 and the bearing layer 4. The mixture layer 3 is constituted by a mixture of the constituents of the overlay and one element selected from the group consisting of Ni, Co and Fe, and the rear face-plating layer 6 preferably has a thickness of 0.1 to 5 microns.

The first and second embodiments will be explained in more detail below with reference to examples thereof.

To prepare a metal sheet for a bearing layer of aluminum alloy, an aluminum-alloy sheet which consisted by weight of 12% Sn, 2.5% Si, 1.7% Pb, 1% Cu, 0.3% Sb, and the balance Al was pressure-bonded, by rolling, to a backing metal of steel having a thickness of 1.20 mm and the same configuration as that of the aluminum-alloy sheet. Then, this metal sheet was treated by heating at 350° C. for four hours to produce a bimetal strip (1.65 mm in thickness and 110 mm in width) as a material for a sliding bearing. This bimetal strip was press formed into a half cylindrical bearing member of size suitable for bearing performance tests, then mechanically worked into a predetermined size (56 mm in outer diameter, 17 mm in length and 1.5 mm in thickness), and then defatted with a solvent. Thereafter, the bearing member was subjected to alkali etching in an aqueous solution of anhydrous sodium carbonate, sodium phosphate, and sodium hydroxide at a temperature of 50° C. for about 60 seconds. The alkali-etched bearing member was next subjected to acid treatment, followed by zincate treatment (the treatment of dissolving zinc oxide in an aqueous solution comprising essentially sodium hydroxide, immersing the bearing member in this aqueous solution at 20° C. for about 20 seconds, and precipitating zinc on the surface of the bearing member). The thus-treated bearing member was then subjected to electroless plating with Ni (whose liquid concentration was adjusted so that a plating layer having a thickness of 0.05 to 0.2 microns could be formed by immersing the bearing member in an aqueous solution essentially comprising nickel sulfate, at 50° C. for about 15 to 60 seconds, preferably for 30 seconds). The thus-treated metal was finally subjected to electroplating for providing an overlay and electroplating for providing a rear face-plating lever at the same time. In each of these electroplating steps, the liquid concentration and the magnitude of electric current were determined so that a plating layer having a thickness of about 0.8 microns could be formed by energization of about 60 seconds. In this manner, a finished bearing product was prepared. In each finished bearing product according to this embodiment, the inner-face overlay was 8 microns thick, the Ni-overlay mixture layer 0.1 microns thick, the bearing layer of aluminum alloy 0.3 mm thick, the backing layer of steel 1.2 mm, and the rear face-plating layer 1.5 micron thick.

In order to compare this finished bearing product of the embodiment with conventional products, the materials, size and process which were the same as those used in the above embodiment were utilized to produce three kinds of comparative products according to the prior art. One kind was a bearing with no overlay, another kind being a bearing including an overlay which was directly provided on a bearing layer of aluminum alloy, and other kind is a bearing including an Ni intermediate layer (2 microns thick) provided on a bearing layer of aluminum alloy and an overlay provided on this intermediate layer. Moreover, the Sb content and the Cu content in the Sn-base alloy which constituted the overlay were varied to investigate the resultant variations in the properties of the overlay of the above bearing of this embodiment. Further, in order to confirm the improved effect of improving the fretting, a bearing was produced which was the same as the above-described finished bearing product of this embodiment except that the thickness of the rear face-plating layer of 8 microns in thickness was provided, and this bearing was subjected to a comparative test.

Table 1 shows the bonding strength between an overlay and a bearing of aluminum alloy, maximum fatigue load, and maximum seizure load which were obtained through tests conducted with bearing samples.

TABLE 1

| Overlay constituents | Bonding layer | Bonding strength | Maximum fatigue load (kgf/cm$^2$) | Maximum seizure load (kgf/cm$^2$) |
|---|---|---|---|---|
| Products of the present invention | | | | |
| Sn | Mixture layer | Sufficient | 900 | 1200 |
| Sn-10% Sb | Mixture layer | Sufficient | 950 | 1200 |
| Sn-5% Cu | Mixture layer | Sufficient | 950 | 1200 |
| Sn-2% Cu-6% Sb | Mixture layer | Sufficient | 950 | 1200 |
| Products for comparison | | | | |
| No overlay | — | — | 700 | 1000 |
| Sn | No layer | Exfoliated with tape | 500 (Exfoliated) | 900 (Exfoliated) |
| Sn | 2-micron thick intermediate Ni layer | Sufficient | 850 (Seized) | 950 |
| Sn-25% Sb | Mixture layer | Sufficient | 950 | 1000 |
| Sn-20% Sb | Mixture layer | Sufficient | 950 | 1000 |

In Table 1, the maximum fatigue load is the maximum load within which no fatigue occurred as the result of a 20-hour continuous running with a rotational speed of 3,250 r.p.m. when a lubricating oil of SAE 20, preheated at 100° C., was used. The maximum seizure load is decided in such manner that, after effecting a 1-hour continuous no-load accustomed running at a rotational speed of 3,600 r.p.m. with a lubricating oil of SAE 20 preheated at 100° C., the level of loading was cumulatively increased by 50 kgf/cm$^2$ each time ten minutes elapsed, and the seizure was assumed to occur when the temperature of the rear face of the bearing exceeded 220° C. or when the value of electric current for driving the shaft during the test exceeded 20 amperes.

Regarding the bonding strength of the overlay with respect to the bearing layer of aluminum alloy, as can be seen from Table 1, the overlay, which was directly provided on the bearing layer of aluminum alloy without the use of a bonding layer, was easily exfoliated in an exfoliation test using an adhesive tape. In either case of the bearing of this embodiment which had a mixture layer and the prior art bearing having the 2-micron thick Ni intermediate layer, the overlay exhibited a sufficient bonding strength.

The maximum fatigue loading of each bearing sample was as follows. The maximum fatigue loadings of the bearing with no overlay and the bearing having an overlay of inferior bonding strength were small values. The bearing having the 2-micron thick intermediate layer of Ni caused seizure before reaching its maximum fatigue loading. In the case of this bearing, Ni was exposed due to the partial abrasion of the overlay and it is considered, therefore, that the seizure was caused by the Ni-exposed portion. The bearings each having a mixture layer consisting of a mixture of Ni and an overlay showed a sufficiently high level of maximum fatigue load whether they were products of this invention or comparative products.

The maximum seizure load of each bearing sample was as follows. The maximum seizure load of the bearing with no overlay was a small value. In the case of the bearing having an overlay directly provided on a bearing layer of aluminum alloy, the temperature of the rear face of the bearing exceeded 220° C. when the load was increased to 950 kgf/cm$^2$ and, at this time, the overlay of the bearing caused exfoliation. The bearing having the 2-micron thick Ni intermediate layer caused seizure at the time when its load reached 950 kgf/cm$^2$, in which case the exposure of the Ni-plating layer was observed on the surface of the bearing. The maximum seizure load of the bearings each having a mixture layer consisting of a mixture of Ni and an overlay was a relatively small value when the Sb content and the Cu content were large. It is considered that this resulted from the fact that the hardness of the overlay excessively increased by the high level of Sb or Cu to thereby deteriorate the compatibility of the overlay.

Next, other bearings were produced utilizing the same production conditions and materials as those used in the above embodiment shown in Table 1 except that Al - 17%Sn - 1.7%Pb - 0.9%Cu - 0.3%Sb (Al-Sn type alloy), Al - 12%Pb - 5%Sn - 4%Si - 1%Cu (Al-Zn type alloy), and Al - 3.5%Zn - 3%Si - 1%Pb - 1%Cu (Al-Zn type alloy) were employed for the respective bearing layers of aluminum alloy. These bearings were also subjected to the tests which were the same as those explained in connection with Table 1. In this case, the results also showed tendencies similar to those of the results shown in Table 1.

Next, still other bearings were produced utilizing the same production conditions and materials as those used in the above embodiment shown in Table 1 except that their respective mixture layers were a mixture layer consisting of Co and overlay and a mixture layer consisting of Fe and overlay. These bearings were also subjected to the same tests as those explained in connection with Table 1. In this case, the results also showed tendencies similar to those of the results shown in Table 1.

Fretting does not easily occur in the case of the testing bearings described above. For this reason, first and second bearings were actually mounted in an engine, the first bearing being the same as the bearing having the Sn-2%Cu-6%Sb overlay shown in Table 1 except that its rear face-plating layer was 0.5 microns thick, while the second bearing was the same as the first bearing except that its rear face-plating layer was 0.8 microns thick. That is, each of the first and second bearings was mounted in an inline type of 1,500-cc 4-cylinder diesel engine provided with a turbocharger, and the occurrence or nonoccurrence of fretting was visually inspected. It was confirmed that no fretting occurred on the first bearing or the second bearing, but migration was observed on the second bearing through the visual inspection.

As described above, in accordance with the first aspect of the present invention, there is provided a multilayer type sliding bearing of aluminum alloy which has a mixture layer constituted by a mixture of the constituents of the overlay and one element selected from the group consisting of Ni, Co and Fe, the mixture layer being provided between the bearing layer of aluminum alloy and the overlay. Since this first multi-layer type sliding bearing of aluminum alloy is superior in maximum fatigue load and maximum seizure load in comparison with the prior art multi-layer type sliding bearing of aluminum alloy, it is free from the aforesaid disadvantages of the prior art. Accordingly, the first multi-layer type sliding bearing of aluminum alloy is particularly suitable for use in a high-speed diesel engine or an engine with a turbocharger which is used under high-speed and high-load conditions.

The multi-layer type sliding bearing of aluminum alloy according to the second aspect of the invention has a rear face-plating layer in addition to the construction of the first multi-layer type sliding bearing of aluminum alloy described above. The second multi-layer type sliding bearing of aluminum alloy is superior in maximum fatigue load and maximum seizure load to the prior art multi-layer type sliding bearings of aluminum alloy and has the ability to improve fretting. Accordingly, it is possible to eliminate the aforesaid disadvantages of the prior art.

What is claimed is:

1. In a multi-layer type sliding bearing of aluminum alloy, having a backing layer of steel, a bearing layer of aluminum alloy bonded to the backing layer, and an overlay layer, the improvement further comprising a mixture layer of a thickness of not more than 0.5 microns between the bearing layer and the overlay layer in a bonded relation to both the bearing layer and said overlay layer, said mixture layer being constituted by the material of the overlay layer and one element selected from the group consisting of Ni, Co and Fe, said overlay consisting by weight of 0 to 15% Cu, 0 to 20% Sb, and the balance- Sn and incidental impurities.

2. A multi-layer type sliding bearing of aluminum alloy, having a backing layer of steel provided on one side thereof with a rear face-plating layer provided on rear face thereof, a bearing layer of aluminum alloy bonded to another side of the backing layer, an overlay layer, and a mixture layer of a thickness of not more than 0.5 microns between the bearing layer and the overlay in a bonded relation to both the bearing layer and said overlay, said mixture layer consisting essentially of the overlay and one element selected from the group consisting of Ni, Co and Fe, said overlay consisting by weight of 0 to 15% Cu, 0 to 20% Sb, and the balance Sn and incidental impurities.

3. A multi-layer type sliding bearing of aluminum alloy as claimed in claim 2, wherein the rear face-plating layer consists of the same constituents as the overlay, the thickness of the rear face-plating layer being in a range of 0.1 to 5 microns.

4. In a method of producing a multi-layer type sliding bearing of aluminum alloy, comprising the steps of: providing a half cylindrical or cylindrical bearing member made of an aluminum alloy, said bearing member being bonded onto a backing layer of steel; and electrolytically providing an overlay layer on the inner face of the bearing member which overlay layer consists by weight of 0 to 15% Cu, 0 to 20% Sb, and the balance Sn and incidental impurities, the improvement further comprising the step of providing a mixture layer having a thickness of not more than 5 microns between said overlay layer and said bearing layer of aluminum alloy by a combination of an electroless deposition and an overlay electroplating, said mixture layer being constituted by a mixture of the constituents of said overlay and one element selected from the group consisting of Ni, Co and Fe.

5. A method of producing a multi-layer type sliding bearing of aluminum alloy claimed in claim 4, wherein said step of electrolytically providing said overlay layer on said inner face of said bearing member further includes the step of electrolytically providing, on the rear face of said bearing, a plating layer which has a thickness of 0.1 to 5 microns and which is constituted by the constituents which are the same as those of said overlay layer.

6. A multi-layer slide bearing, comprising a base layer (5) of steel, a bearing layer (4) of an aluminum alloy bonded to said base layer (5), a coating (1), and an intermediate layer (3) between said bearing layer (4) and said coating (1) and bonded to said bearing layer (4) and said coating,
said intermediate layer being a mixed layer having a thickness of no more than 0.5 μm, consisting of a mixture of the coating (1) and an element selected from the group consisting of Ni, Co and Fe, said element being discontinuously present in the mixed layer; and said coating layer (1) consisting of 0 to 15% by weight of Cu, 0 to 20% by weight of Sb, and the remainder of Sn and accidental impurities.

7. A multi-layer slide bearing, comprising a base layer (5) of steel, a bearing layer (4) of an aluminum alloy bonded to the base layer (5), a coating (1), and an intermediate layer (3) between the bearing layer (4) and the coating (1) bonded to the bearing layer (4) and the coating, and a plating layer (6) is applied to the back of the base layer (5),
said intermediate layer being a mixed layer (3) with a thickness of no more than 0.5 μm, consisting of a mixture of the coating (1) and an element selected from the group consisting of Ni, Co and Fe, which element is discontinuously present in the mixed layer (3), and wherein the coating (1) consists of 0 to 15% by weight of Cu, 0 to 20% by weight of Sb, and the remainder of Sn and accidental impurities.

8. A multi-layer slide bearing in accordance with claim 7, wherein the plating layer (6) consists of the same materials as the coating and its thickness is in the range between 0.1 to 5 μm.

9. A method for producing a multi-layer slide bearing, comprising:
(a) providing a semi-cylindrical or cylindrical bearing part, a bearing layer (4) of which is made of an aluminum alloy and is bonded on one side with a support layer (5) of steel;
(b) forming an intermediate layer on the other side of the bearing layer (4) of an aluminum alloy by applying a zinc film by the use of a zinc treatment and partial removal of the zinc film and application of an element; and
(c) electrolytic application of a coating (1) on the intermediate layer,
wherein by means of the following method steps a mixed layer (3) is applied as an intermediate layer:
1. providing said zinc film on the bearing layer (4) of aluminum alloy by alkali etching, acid treatment and zincate treatment,
2. partially replacing said zinc film by an element selected from the group consisting of Ni, Co and Fe, by dipping the zinc film into an electroless plating liquid in such a way that a discontinuous layer of the element is formed, and 3. forming said coating (1) on the discontinuous layer in such a way that the discontinuous layer is embedded into the coating (1) and in this way a mixed layer (3) is formed, wherein the discontinuous layer of the element is present in the coating (1), the coating consisting of 0 to 15% by weight of Cu, 0 to 20% by weight of Sb, the remainder of Sn and accidental impurities.

10. A method for producing a multi-layer slide bearing in accordance with claim 9, wherein the method step of electrolytic application of the coating (1) also includes the method step of the electrolytic application of a plating layer (6), having a thickness of 0.1 to 5 μm and consisting of the same components as the coating (1), on the back of the slide bearing.

* * * * *